Figure 1:
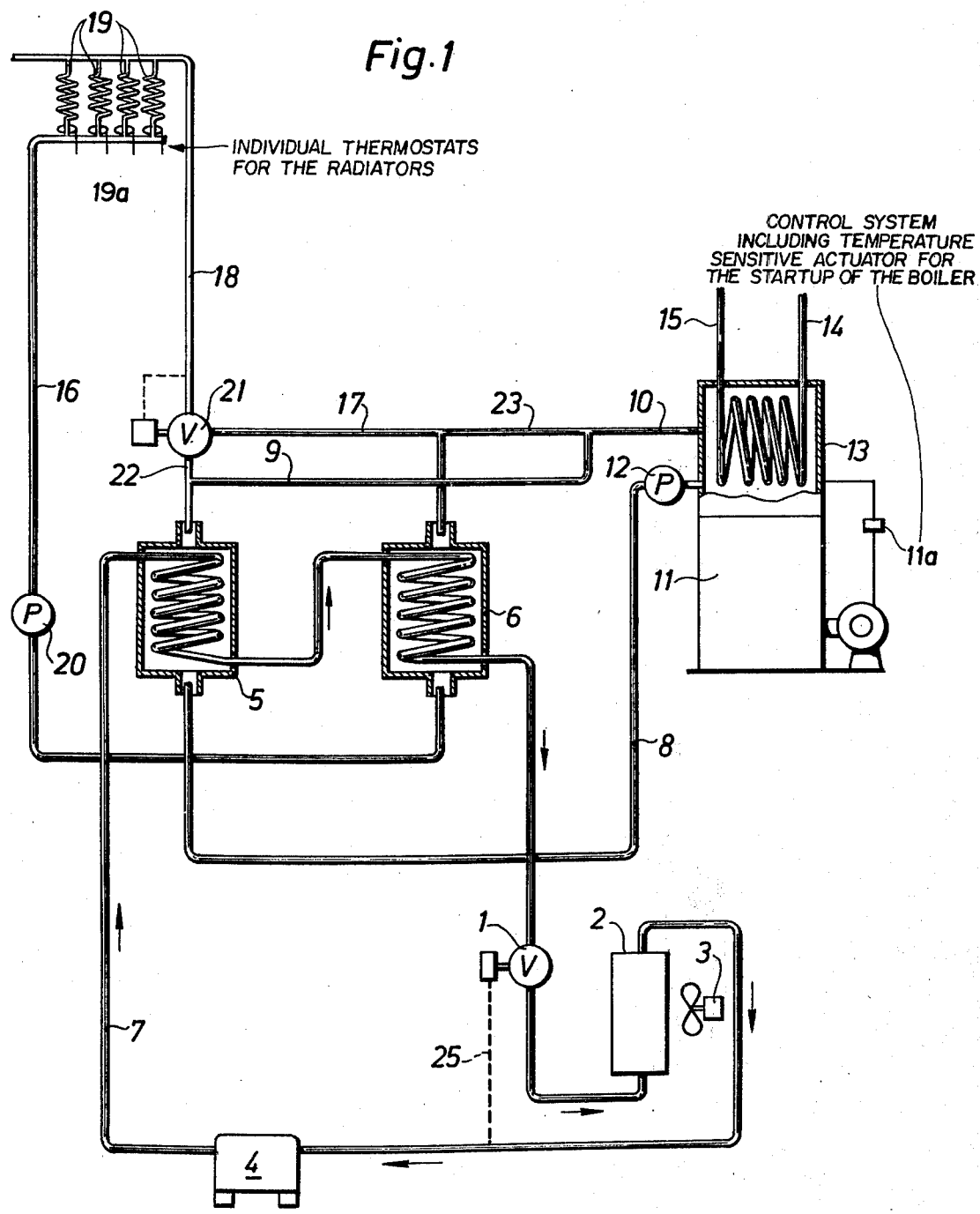

United States Patent [19]

Gustafsson

[11] 3,989,183

[45] Nov. 2, 1976

[54] METHOD AND APPARATUS EMPLOYING A HEAT PUMP FOR HEATING FLUIDS IN DIFFERENT FLOW CIRCUITS

[75] Inventor: Berth Ulrik Gustafsson, Osterskar, Sweden

[73] Assignee: Projectus Industripdukter AB, Stockholm, Sweden

[22] Filed: Dec. 4, 1974

[21] Appl. No.: 529,527

[30] Foreign Application Priority Data

Dec. 20, 1973  Sweden ........................... 73173163

[52] U.S. Cl. .............................. 237/2 B; 62/238; 165/29; 165/62; 237/8 R
[51] Int. Cl.² ................................... G05D 23/02
[58] Field of Search ............... 237/2 B, 56, 61, 8 R, 237/1 A; 62/324, 238, 506; 165/29, 62

[56] References Cited
UNITED STATES PATENTS

| | | | |
|---|---|---|---|
| 2,418,446 | 4/1947 | Anderson | 62/238 X |
| 2,611,587 | 9/1952 | Boling | 62/506 X |
| 2,619,326 | 11/1952 | McLenegan | 237/2 B X |
| 3,301,002 | 1/1967 | McGrath | 62/324 X |
| 3,407,620 | 10/1968 | Lodge | 62/159 |
| 3,486,985 | 12/1969 | McGrath | 62/238 X |
| 3,654,988 | 4/1972 | Clayton | 165/29 X |
| 3,662,563 | 5/1972 | Sudmeier | 62/506 X |

Primary Examiner—William E. Wayner
Assistant Examiner—William E. Tapolcai, Jr.
Attorney, Agent, or Firm—Toren, McGeady and Stanger

[57] ABSTRACT

There is provided a method and apparatus for heating tap water and radiator water by means of a heat pump, and complementarily also by means of a conventional fuel fired furnace. The condensor unit of the heat pump is divided into two heat exchangers. The first heat exchangers takes care of the superheat, and some of the condensation heat of the coolant vapor of the heat pump, and heats the tap water to a temperature which is higher than the condensation temperature. The second heat exchanger condensor heats the radiator water to a temperature corresponding to the condensation temperature of the coolant vapor.

6 Claims, 2 Drawing Figures

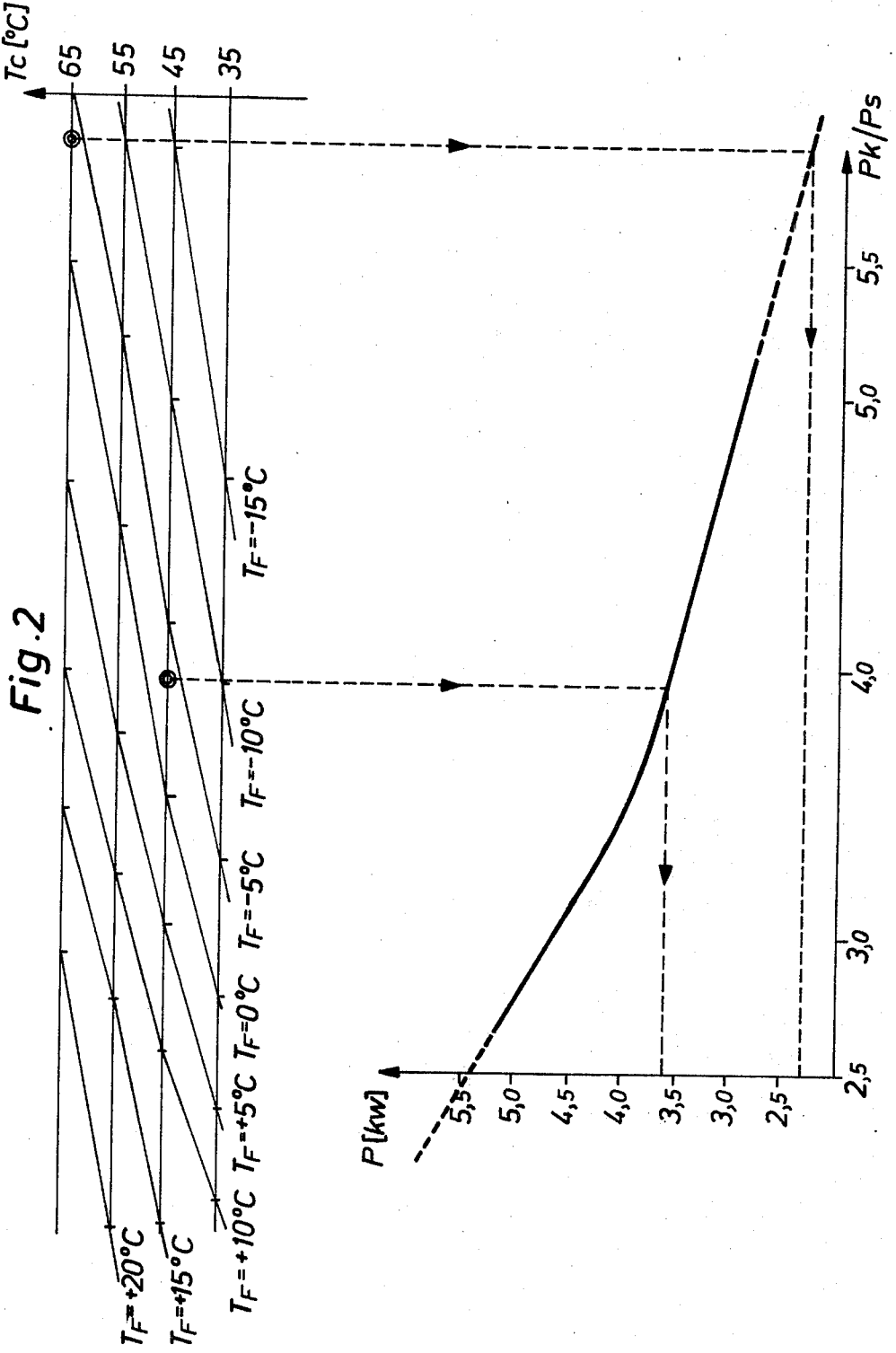

METHOD AND APPARATUS EMPLOYING A HEAT PUMP FOR HEATING FLUIDS IN DIFFERENT FLOW CIRCUITS

The present invention relates to a method and apparatus for heating fluids flowing in different circuits for various purposes by means of a heat pump comprising a coolant circuit having an expansion valve, a vaporizer, a compressor and a condensor unit.

It has been known for a long time to use heat pumps to heat air and/or water for heating houses and tap water.

However, there are many problems and drawbacks connected with the use of heat pumps for these purposes.

Presuming a constant condensation temperature for the coolant, a heat pump has a "heat production ability", i.e. a quotient between emitted and supplied energy, which is considerably reduced with decreasing air temperatures outside. Furthermore, the heat requirement for living accommodation obviously rises as the outside temperature drops.

It is uneconomical to dimension a heat pump to cover the total heating requirement in houses on the coldest day of the year. Generally the heating requirement for a normal, one-family house (120–200 m$^2$) is calculated to be about 10 kW at the most. It is considered that the output of the heat pump then suitably should be 3–4 kW and that any additional heat requirement is covered by direct electric heating.

From the point of view of the power producer and distributor it is obviously inadvisable for heating units to be used which have a low electricity consumption at high outside temperatures and a high electricity consumption at low outside temperatures. The combination with other consumers of power will be extremely unfavourable.

In view of the inverse characteristic of the heating pump, therefore, there is good reason, for a certain heat requirement in a house in a Nordic climate, to make a certain balance between the capacity of the heating pump and the maximum thermal efficiency required and furthermore to endeavour to supplement the heating pump with a fuel fired boiler for the maximum thermal efficiency exacted. It would probably be advisable to dimension the heating pump so that it can manage the total heat requirement of the house, including hot water production, for example over the period Apr. 1, to Nov. 1, and count on the oil boiler to lop the load peaks.

In the literature concerning the use of heat pumps for residential service pusposes a number of heating plants are described in U.S. Pat. Nos. 2,690,649, 2,707,869, 3,069,867, 3,078,689 and 3,407,620, for example, but these give no solution as to how fluids can be easily heated in various circuits, for example radiator water or tap water.

The method according to the invention is characterized by arranging the condensor unit in the form of at least two series-connected condensors on the coolant side, arranging the individual fluid circuits in heat exchanging relation to the condensor(s) which provides the desired fluid temperature for the purpose, and connecting a conventional heating boiler in the fluid circuit having the highest temperature.

In this connection the boiler circuit may be connected to the high temperature condensor(s) and the radiator circuit to the low temperature condensor(s), the boiler circuit connected to the radiator circuit via a three-way valve which, when the sensed temperature in the radiator circuit falls too low, permits boiler water to be added to the radiator circuit, the excess water in the radiator circuit being shunted into the boiler circuit, the tap water heated by means of heat-exchange with the boiler water and the conventional heating unit of the heating boiler be brought into operation if the water temperature in the boiler circuit falls below a predetermined value.

The apparatus for performing the method is characterized in that the condensor unit is arranged in the form of at least two series-connected condensors, that respective fluid circuits are connected to the condensor(s) yeilding the fluid temperature desired for the purpose, and that a conventional heating boiler is connected in the fluid circuit having the highest temperature. The means may thus be designed so that the boiler circuit iis connected to the higher temperature condensor(s) and the radiator circuit to the low temperature condensor(s), that the boiler circuit is connected to the radiator circuit via a three-way mixing valve which is arranged, when the water temperature in the radiator circuit falls too low, to permit boiler water to be added to the radiator circuit, a shunt-conduit being arranged to transfer excess water from the radiator circuit to the boiler circuit, that the tap water is arranged to be heated by means of heat-exchange with the boiler water, and that the conventional heating unit of the heating boiler is arranged to come into operation if the water temperature in the boiler circuit falls below a predetermined value. In order to simplify the control system, the radiators may be provided with individual thermostats.

The water system is arranged in two circuits: One circuit comprises the heating boiler (or furnace), circulation pump, high temperature condensor. This circuit operates preferably at a temperature level of 55°–65° C. The other circuit consists of the radiators, circulation pump, low temperature condenser. This circuit operates preferably at a temperature level of 45° C.

The high temperature condensor receives its heat from over-heated coolant vapor, for example freon 22, suitably at a pressure of 10–25 bar and a temperature of 65°–86° C. The condensor is preferably a counter-flow heat-exchanger. The coolant vapor loses its excess heat to the high temperature condensor and gives off also some of its latent heat. The temperature level is then 55°–65° C. The low temperature condensor preferably operates at a temperature level of about 45° C and the final condensation of the coolant vapor takes place here. The final temperature of the low temperature condenser of course determines the pressure on the high pressure side of the compressor. It is important to keep the condensor temperature (and thus the saturation pressure) as low as possible for two reasons:

1. The thermal efficiency of the heating pump decreases rapidly with increasing difference in temperature between condensation and vaporization.
2. If the pressure differential between condensor and vaporizer increases, the volumetric efficiency of the compressor will be reduced due to the influence of the dead space.

The system of two condensors at different temperature levels thus enables the heating boiler water (and hot water for consumption) to have relatively high temperature and still maintain a satisfactory degree of efficiency for the heat pump.

If, now, the heat pump capacity is not sufficient to keep the water in the radiator circuit at, for example 45° C, the thermostatically controlled three-way valve will open to allow in the hotter boiler water. When the temperature of the boiler water has dropped to a certain value (in cold weather of if a considerable quantity of hot water is consumed), the oil burner will start up and re-establish the boiler temperature.

If the thermal output of higher than the heat pump can manage, therefore, the oil burner will come into operation and provide the necessary additional heat. This normally occurs in cold weather, i.e. when the capacity of the heat pump has decreased and the heat requirement in residences increases.

Normally a heat pump superheats the vapor. This superheating which is unavoidable has hitherto been considered as disadvantageous. The invention utilizes this effect in an advantageous way by providing a temperature level which is higher than the condensation temperature of the vapor. This raised temperature level (corresponding to the superheating of the vapor) in the first "condensor" (rather a heat exchanger only) of the condensor unit is of significance, as should be appreciated by those skilled in the art.

A heat pump can work efficiently only if the vaporizer-condensor temperature difference is less than a certain valve, say 45° C.

Should the desired minimum output temperature be 55° C, this means that an ordinary heat pump is useful only if the ambient temperature (or vaporizer temperature) is higher than 10° C.

In contrast, the present invention can provide the desired 55° C output temperature, at least for a part of the output energy flow, even for ambient (or vaporizer) temperatures around 0° C, while the condensation temperature is held at around 45° C, which is sufficient for the radiator water.

The advantage of the invention can alternatively be said to be that it provides a higher output temperature than ordinary heat pump system, while having the same condensation and vaporizing temperatures.

Again for equal prerequisites (input temperature; output temperature) the inventive heat pump system is more efficient than a ordinary heat pump system, as its vaporizer-condensor temperature difference is lower than that of an ordinary heat pump.

In the following the invention will be described more fully with reference to the accompanying drawings in which FIG. 1 shows schematically a means according to the invention;and FIG. 2 shows the power output from a tested heat pump, depending on the external air temperature and the condensing temperature.

FIG. 1 shows a heat pump comprising a thermal expansion valve 1, a vaporizer 2, activated by a fan 3, a compressor 4 and a high temperature condensor 5 and a lower temperature condensor 6. The units 1, 2, 4, 5, 6 are connected in series in a tubular circuit 7 containing freon 22, for example, or some similar coolant. The vaporizer 2 is in contact with the outside air and/or warm air coming, for example, from the building in which the heating plant according to the invention is connected, the fan 3 forcing the heat exchange between air and coolant. The coolant flows in clockwise direction as shown by the arrows.

The coolant is over-heated to 4° C in the vaporizer 2 and compressed in the compressor 4, after which the coolant gas which has thus been warmed flows to the condensor 5 in which the gas emits some of its heat at a certain temperature level, and to the condensor 6 in which the gas emits the rest of its heat content during condensation. The condensate then flows on to the thermal expansion valve 1 which permits the coolant to expand depending on the pressure of the over-heated coolant in the vaporizer 2, sensed via a conduit 25.

A boiler water circuit 8–10 is connected in heat-exchanging relation to the high temperature condensor 5. The circuit 8–10 includes a conventional heating boiler 11, preferably oil-fired, and a circulation pump 12. The boiler 11 has a boiler water tank 13 in which cold tap water supplied through a pipe 14 is heated by means of heat-exchange with the boiler water. The hot water can then be withdrawn through a hot water pipe 15.

A radiator water circuit 16–18 is connected in heat-exchanging relation to the low temperature condenser 6. The circuit 16–18 comprises a plurality of radiators 19, preferably provided with individual thermostats 19a, a circulation pump 20 and a control valve 21.

The circuit 8–10 is connected to the circuit 16–18 by way of a pipe 22 which connects the circuit 16–18 after the condensor 5 to the control valve 21.

The control valve 21 is a three-way mixing valve which is thus connected to the boiler circuit after the high temperature condensor and is connected in series with the radiator circuit after the low temperature condensor. The valve 21 is arranged to sense the water temperature in the supply pipe 18 for the radiators and, depending on this temperature, to permit the hotter water from the boiler circuit to be transferred to the radiator circuit if the temperature there is less than 45° C, for example, which is suitable temperature for radiator water.

The excess water in the radiator circuit can then be transferred to the boiler water circuit through a shunt conduit 23.

The heating boiler 11 is provided in the normal way with a control system 11a which checks the temperature of the boiler water for permitting the boiler to start up if the temperature of the boiler water falls below 60° C, for example, as is suitable in the heating plant according to the invention.

FIG. 2 shows the relation between the power output [P] vaporizer temperature [$T_F$] and condensing temperature [$T_C$] in a heat pump as used in accordance with the invention. The ambient air temperature is 4° C higher than that of the vaporizer. $p_k/p_s$ refers to the ratio between the condensate pressure and vapor pressure, (or the ratio between output and input pressure at the compressor). The compressor used is of mark AS-PERA (220 V, 1-phase) and has a rated input of 1280 W.

If, as is customary in accordance with known technique, a single condensor having a temperature of 65° C is used to achieve a water temperature sufficient to heat both tap water and radiator water, and the outside temperature is for example 0° C (vaporizer temperature = −4° C) the heat pump will emit ≈ 2.3 kW, giving an increase of ≈2.3 − 1.3 = 1.0 kW.

If, in accordance with the invention, a two-stage condensor is used in which the low temperature condensor has a condensing temperature of 45° C, under otherwise similar conditions the pump will give 3.6 kW, i.e. an increase of 3.6 − 1.3 = 2.3 kW. At the same time the high temperature condensor has a temperature of around 65° C.

From this example it is clear that the invention permits a considerable increase in power output in comparison with known methods, without it being necessary to to curtail requirements for suitable temperatures for the tap water or the radiator water.

The condensors 5, 6 are preferably arranged to transfer heat to the circuits 8–10 and 16–18 by means of the counter-flow method.

What is claimed is:

1. Method of heating a first fluid contained in a first circuit and a second fluid contained in a second circuit by using the heat from a coolant flowing in a heat pump circuit, comprising the steps of vaporizing and superheating the coolant flowing in the heat pump circuit; first, passing the superheated vaporized coolant in the indirect heat transfer relation with the first fluid in the first circuit for extracting the superheat from the coolant in the heat pump circuit; next, passing the vaporized coolant in indirect heat transfer relation with the second fluid in the second circuit for condensing the vaporized coolant and heating the second fluid; then recirculating the coolant to repeat the vaporizing and superheating step; and arranging a heat device in the path of the first circuit for selectively supplying heating to the first fluid flowing through the first circuit.

2. Method of heating, as set forth in claim 1, including the step of circulating the heated first fluid through the heating device in the path of the first circuit for supplying heat to another fluid flowing to the heating device for transferring heat from the first fluid to the another fluid; and selectively introducing additional heat into the heating device when the temperature of the first fluid therein falls below a predetermined level.

3. Method of heating, as set forth in claim 2 including the furthr steps of interconnecting the first circuit and the second circuit for selectively admitting a portion of the first fluid into the second circuit if the temperature of the second fluid drops below a predetermined level and for directing the increased flow in the second circuit back into the first circuit.

4. Apparatus for performing the method according to claim 1, comprising a first conduit system arranged to circulate the first fluid; a second conduit system arranged to circulate the second fluid; and a third conduit system arranged to circulate the heat pump coolant; an expansion valve located in said third conduit system, a vaporizer in said third conduit system for vaporizing the heat pump coolant, a compressor in said third conduit system arranged to receive and compress the vaporized coolant from said vaporizer, a first heat exchange member located in said third conduit system and arranged to receive the compressed coolant from said compressor, and a second heat exchange member arranged in said third conduit system in series with said first heat exchange member and arranged to receive the coolant after it flows through said first heat exchange member; said first conduit system connected to said first heat exchange member so that the first fluid flows through the first heat exchange member in indirect heat transfer relation with the heat pump coolant; said second conduit system connected to said second heat exchange member so that the second fluid flows through the second heat exchange member in indirect heat transfer relation with the heat pump coolant; a heating furnace located in said first conduit system, a pipe extending through said heating furnace for flowing a third fluid therethrough so that the first fluid flows through the heating furnace for effecting indirect heat transfer to the third fluid flowing through said pipe, and said heating furnace having a heating means separate from the first fluid for selectively supplying additional heat to the third fluid.

5. Apparatus, as set forth in claim 4 wherein said pipe circulates tap water; a plurality of radiators connected to said second conduit system for using the second fluid in said radiators as a source of heat; means including a three-way mixing valve connected to said first conduit system and to said second conduit system downstream from said first heat exchange member and said second heat exchange member, respectively, for selectively flowing the first fluid heated in said first heat exchange member into said second conduit system for flow with the second fluid to said radiators; a shunt conduit interconnecting said first and second conduit systems for transferring excess fluid flowing in said second conduit system into said first conduit system so that the excess fluid circulates through said first conduit system; and control means connected to said heating means and in communication with the first fluid in said heating furnace for effecting the operation of the heating means when the temperature of the first fluid flowing through said heating furnace drops below a predetermined level.

6. Apparatus, as set forth in claim 5, wherein a separate thermostat is associated with each of said radiators.

* * * * *